(12) United States Patent
Volkov et al.

(10) Patent No.: US 7,130,881 B2
(45) Date of Patent: Oct. 31, 2006

(54) REMOTE EXECUTION MODEL FOR DISTRIBUTED APPLICATION LAUNCH AND CONTROL

(75) Inventors: Alexei Volkov, Mountain View, CA (US); Konstantin Boudnik, Santa Clara, CA (US); Allan Jacobs, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 729 days.

(21) Appl. No.: 10/137,031

(22) Filed: May 1, 2002

(65) Prior Publication Data
US 2003/0208528 A1  Nov. 6, 2003

(51) Int. Cl.
*G06F 15/16* (2006.01)
*G06F 3/00* (2006.01)
(52) U.S. Cl. .................. 709/203; 709/201; 719/329
(58) Field of Classification Search ........ 709/201–203; 710/328–330
See application file for complete search history.

(56) References Cited
U.S. PATENT DOCUMENTS
6,166,734 A * 12/2000 Nahi et al. .................. 715/748

| | | | |
|---|---|---|---|
| 6,487,607 B1 * | 11/2002 | Wollrath et al. | 719/330 |
| 2002/0052965 A1 * | 5/2002 | Dowling | 709/230 |
| 2002/0078174 A1 * | 6/2002 | Sim et al. | 709/219 |
| 2003/0055877 A1 * | 3/2003 | Williams et al. | 709/203 |

\* cited by examiner

Primary Examiner—Glenton B. Burgess
Assistant Examiner—Yasin Barqadle
(74) Attorney, Agent, or Firm—Martine Penilla & Gencarella, LLP

(57) ABSTRACT

An invention is provided for a remote execution system. The remote execution system includes a first application, such as a server application, having a first plurality of virtual service modules, each capable of providing a particular functionality. In addition, a second application, such as a client application, is included that has a second plurality of virtual service modules substantially equivalent to the first plurality of virtual service modules. Each of these virtual service modules is in communication with a substantially equivalent virtual service module of the first plurality of service modules to form a virtual service module set. In this manner, each virtual service module set is capable of interacting with an application as a single software object that is local to the application.

8 Claims, 6 Drawing Sheets

REMOTE EXECUTION MODEL FOR DISTRIBUTED APPLICATION LAUNCH AND CONTROL

CROSS REFERENCE TO RELATED APPLICATIONS

This application is related to U.S. patent application Ser. No. 09/953,223, filed Sep. 11, 2001, and entitled "Distributed Processing Framework System," which is incorporated herein by reference.

BACKGROUND OF THE INVENTION

1. Field of the Invention

This invention relates generally to distributed software execution, and more particularly to a remote execution model that provides launch synchronization and remote application control.

2. Description of the Related Art

As the use of software in performing daily tasks is increasing rapidly, assessing software reliability through software testing has become an imperative stage in software development cycle. As is well known, software testing is used to find and eliminate defects (i.e., bugs) in software, which if undetected, can cause the software to operate improperly. In general, a stand-alone computer or a network of computer resources can perform software testing. When a stand-alone computer system is used to perform the software testing, the computer system is programmed to run a test selected by the software user. Comparatively, if a network of computer resources is used, the user is responsible for manually adding and deleting the computer resources to the network, programming the master computer system and the server, initiating the running of a user-selected test, and running the test on the group of dedicated computer systems coupled to the server. However, distributed testing of this sort presents launch and control problems, as described next with reference to FIG. 1.

FIG. 1 is a block diagram showing a prior art distributed test configuration 100. The distributed test configuration 100 includes a plurality of test systems 102a–102c, each executing a test application 104a–104c. During launch and subsequent execution, the distributed test configuration 100 cannot provide any control related to the launch and execution. That is, the user cannot control the launch order and execution of the test applications 104a–104c using the prior art distributed test configuration 100. As a result, errors can occur when the test applications depend on each other for proper execution.

For example, during a particular test, test application B 104b may depend on test application A 104a. In particular, test application A 104a may need to connect to test application B 104b to perform a particular test. However, the prior art distributed test configuration 100 generally launches all the application simultaneously, or close to simultaneously. If test system A 102a processes test application A 104a faster than test system B 102b processes test application B 104b, test application A 104a may attempt to establish communication before test application B 104b is ready to establish communication. In such a situation, the communication attempt will fail, and as a result, the test will fail.

Failure can also occur when an application depends on the output of another application. For example, test application C 104c may depend on the output of test application A 104a for proper execution. If test application C 104c attempts to use the output of test application A 104a before test application A 104a has generated the requested output, test application C 104c can fail.

In view of the foregoing, there is a need for a remote execution model for distributed application launch and control. The model should provide a mechanism for remote applications to communicate control and launch information, allowing enhanced operation of the distributed system. In addition, the remote execution model should be extendable to provide increased flexibility in deployment and operation.

SUMMARY OF THE INVENTION

Broadly speaking, the present invention fills these needs by providing a remote execution model that provides efficient execution of tasks on remote resources using virtual service modules. In one embodiment, a remote execution system is disclosed. The remote execution system includes a first application, such as a server application, having a first plurality of virtual service modules, each capable of providing a particular functionality. In addition, a second application, such as a client application, is included that has a second plurality of virtual service modules substantially equivalent to the first plurality of virtual service modules. Each of these virtual service modules is in communication with a substantially equivalent virtual service module of the first plurality of service modules to form a virtual service module set. In this manner, each virtual service module set is capable of interacting with an application as a single software object that is local to the application.

A method for remote execution control is disclosed in a further embodiment of the present invention. A first application is provided that has a first plurality of virtual service modules, each capable of providing a particular functionality. In addition, a second application is provided that has a second plurality of virtual service modules substantially equivalent to the first plurality of virtual service modules. As above, each of these virtual service modules is in communication with a substantially equivalent virtual service module of the first plurality of service modules to form a virtual service module set. In this manner, data is communicated from the first application to the second application using a plurality of the virtual module sets. As above, each application interacts with each virtual service module set as a single software object that is local to the application.

In a further embodiment, a virtual service module structure is disclosed for remote execution. The virtual service module structure includes a first virtual service module that is included in a first application, which is executed on a first computer resource. The first virtual service module is in communication with a network communication channel. The virtual service module structure also includes a second virtual service module that is included in a second application, which is executed on a second computer resource. The second virtual service module is also in communication with the network communication channel, which facilitates communication between the first virtual service module and the second virtual service module. In this manner, the first application and the second application interact with the virtual service module structure as though the virtual service module structure is single object that is located locally to each application. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a remote execution model that provides efficient execution of tasks on remote resources using virtual service modules. Broadly speaking, each virtual service module is in communication with a similar virtual service module on the remote resource via a communication channel, to form a virtual service module set. In this manner, the virtual service module set interacts with applications in a manner similar to a single object that is local to each application. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
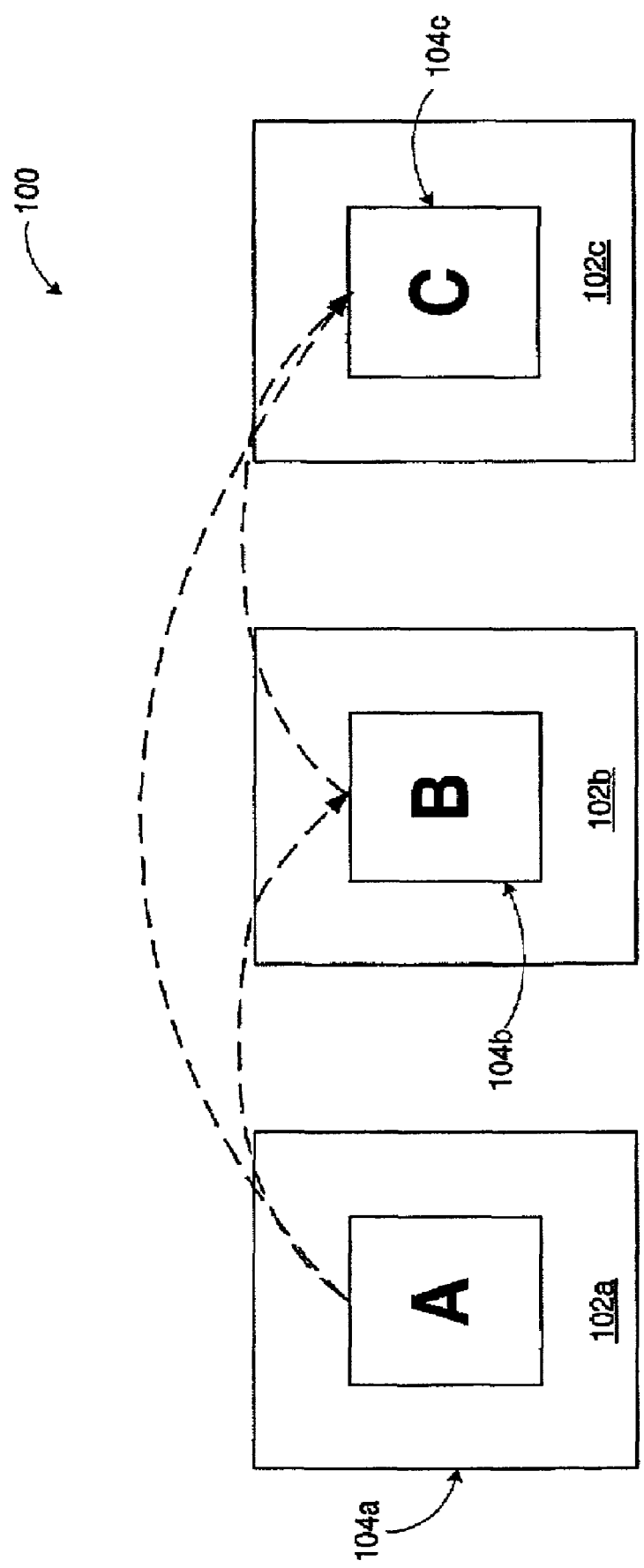
FIG. 1 is a block diagram showing a prior art distributed test configuration.
Figure 2:
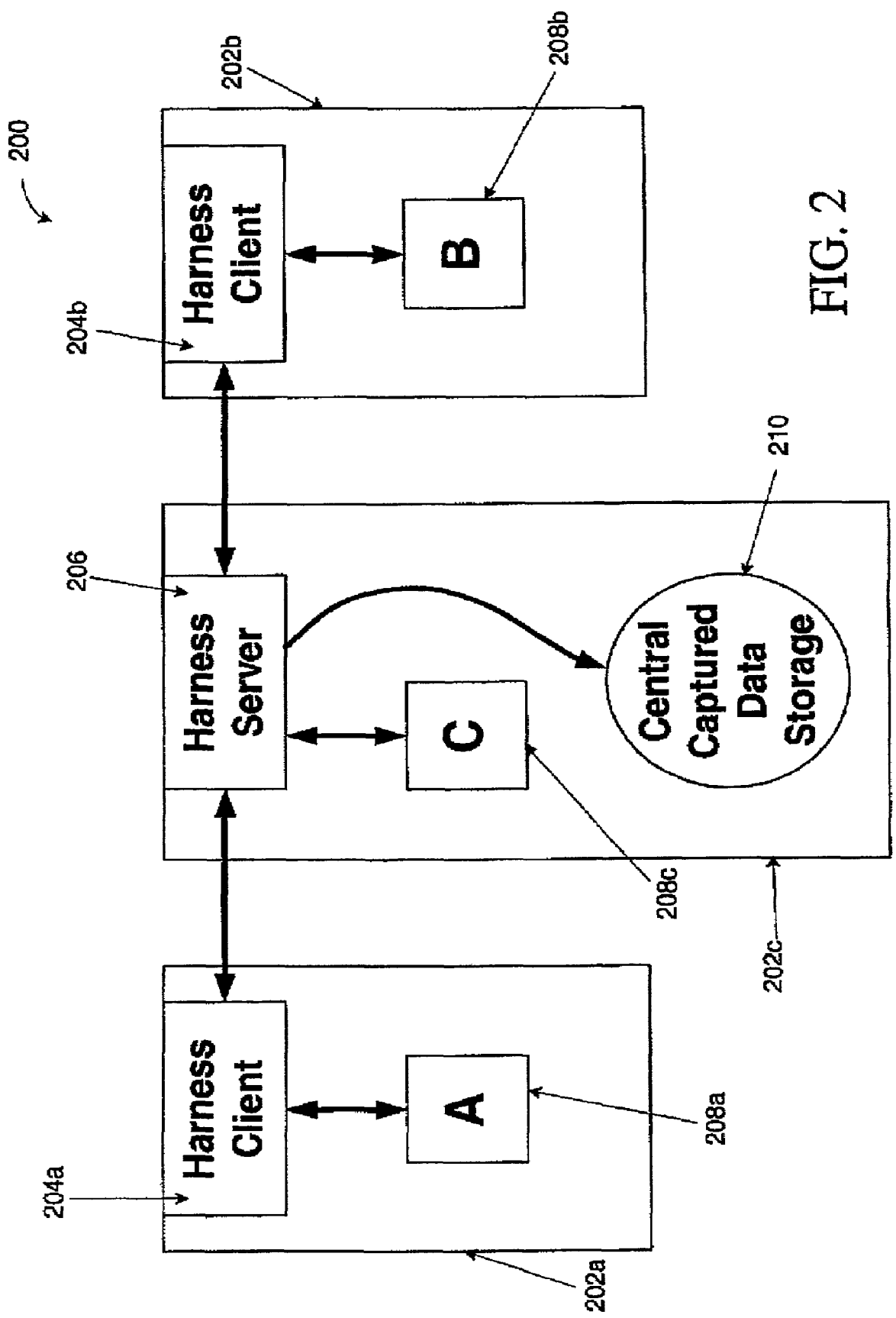
FIG. 2 is a block diagram showing a distributed harness system, in accordance with an embodiment of the present invention.

As mentioned above, embodiments of the present invention provide efficient execution of tasks on remote resources using virtual service modules. In particular, the virtual service modules provide communication between components of a distributed system, such as a harness server and related harness clients. FIG. 2 is a block diagram showing a distributed harness system 200, in accordance with an embodiment of the present invention. The distributed harness system 200 includes a plurality of computer systems 202a–202c, each executing a portion of the distributed harness system 200. In the example of FIG. 2, computer systems 202a and 202b each execute a harness client 204a and 204b. Computer system 202c executes a harness server 206, which is in communication with each harness client 204a and 204b via a plurality of virtual service modules, described in greater detail subsequently. Although two harness clients 204a–204b are shown in FIG. 2, it should be noted that any number of harness clients 204a–204b and applications 208a–208c can be included in a distributed harness system 200 of the embodiments of the present invention.

The exemplary distributed harness system 200 further includes a plurality of remote applications 208a–208c, each executing on the computer systems 202a–202c. Execution and launch control for the applications 208a–208c is provided by the harness server 206 and the harness clients 204a–204b using virtual service modules. In particular, the harness server 206 provides overall control for the distributed harness system 200 by establishing communication with each harness client 204a–204b and providing control commands to each harness client 204a–204b. In one embodiment, each harness client 204a–204b has a relatively small footprint to allow deployment on a large variety of client computers, such as desktop computers and personal digital assistant devices (PDAs), which are handheld computers that serve as organizers for personal information.

In operation, the harness server 206 initializes itself by reading a configuration file, which provides information concerning the particular distributed operating environment in which the distributed harness system 200 is operating. The configuration file includes information such as the particular applications to be launched, special control commands for the applications, and other information needed for proper execution of the distributed operating environment. After initialization, the harness server 206 listens for the harness clients 204a–204b included the distributed harness system 200.

As with the harness server 206, each harness client 204a–204b initializes itself using a client configuration file. Each client configuration file includes information needed by the particular harness client for initialization, such as the location of the harness server 206 and specific configuration parameters needed for a particular test. The harness clients 204a–204b then register with the harness server 206. The registration can include providing system specific information to the harness server 206, such as the computer system type and the operating system executing on the client computer system. The harness server 206 can then use this information to determine the types of operations that the client computer systems 208a–208b can perform.

Once the harness clients 204a–204b are initialized and registered with the harness server 206, the harness server 206 can begin to launch and monitor applications on the client computer systems 202a–202b and on the server computer system 202c. Specifically, the harness server 206 processes a script file that defines what operations the harness server 206 should perform, and any parameters for the operations. These operations can include launching applications on both the client computer systems 202a–202b and on the server computer system 202c, and control commands for launched applications.

For example, in FIG. 2, the harness server 206 receives a command to launch application A 208a, application B 208b, and application C 208c. The command further includes parameters defining on which computer system 202a–202c the applications 208a–208c should be launched. In response, the harness server 206 transmits a command to the harness client 204a to launch application A 208a. The harness server 206 also transmits a command to the harness client 204b to launch application B 208b. Further, the harness server 206 prepares to launch application C 208c on the server computer system 202c. Each harness client 204a–204b then launches the respective application 208a–208b on its computer system 202a–202b. In addition, the harness server 206 launches application C 208c on the server computer system 202c. The script that is processed by the harness server 206 also defines the order and timing of the above application launches.

In addition to launching applications in a controlled manner, embodiments of the present invention monitor the application execution and output to provide further execution control. In particular, each harness module monitors the execution and output of the applications that the harness module launches. For example, the harness client 204a monitors the execution and output of application A 208a, the harness client 204b monitors the execution and output of application B 208b, and the harness server 206 monitors the execution and output of application C 208c.

This information is transmitted to the harness server 206, which analyzes the monitored information. For example, the harness client 204a provides the execution and output information of application A 208a to the harness server 206. In this manner, the harness server 206 can perform predefined operations based on the execution and output information from the various applications under its control. In addition to analyzing the monitored information, the harness server 206 stores the monitored information for each application in a central captured data storage 210. For each application 208a–208c, the central captured data storage 210 includes an application output file, an application error data file, and an application log file. The application output file stores the output generated by the application. The application error data file stores errors that occur during execution of the related application, and the application log file stores a record of the execution of the application. For example, when the application is a test, the application log file stores a test log.

In addition to launching the distributed harness system 200 manually, as illustrated in FIG. 2, the distributed harness system 200 can be launched in an automated manner, as described next with reference to FIGS. 3–5. In particular, a distributed harness system 200 of embodiments of the present invention can be launched using a distributed processing framework (DPF). In one example, the DPF system of the embodiments of the present invention uses the Jini™ (hereinafter "Jini") technology to provide spontaneous interaction between its components. In this manner, the computer systems attach to and detach from an ad-hoc network of processing resources (e.g., computer resources) without disturbing the DPF system. Accordingly, the computer resources are not limited to executing the distributed harness system of the embodiments of the present invention that is submitted to the DPF system.

DPF systems of the embodiments present invention can be distributed test framework (DTF) systems configured to manage test suite execution on cross-platform dynamically networked computer systems. In one implementation, the DTF system can include a server computer system and a plurality of ad-hoc network of processing resources configured to spontaneously interact implementing the Jini technology. The server computer system is configured to include a Jini look up service and a system controller configured to manage the processing of the submitted test suites. In one instance, the plurality of computer resources join the Jini look up service registering their respective proxies and the corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite.

As embodiments of the present invention can use the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code." The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Figure 3:
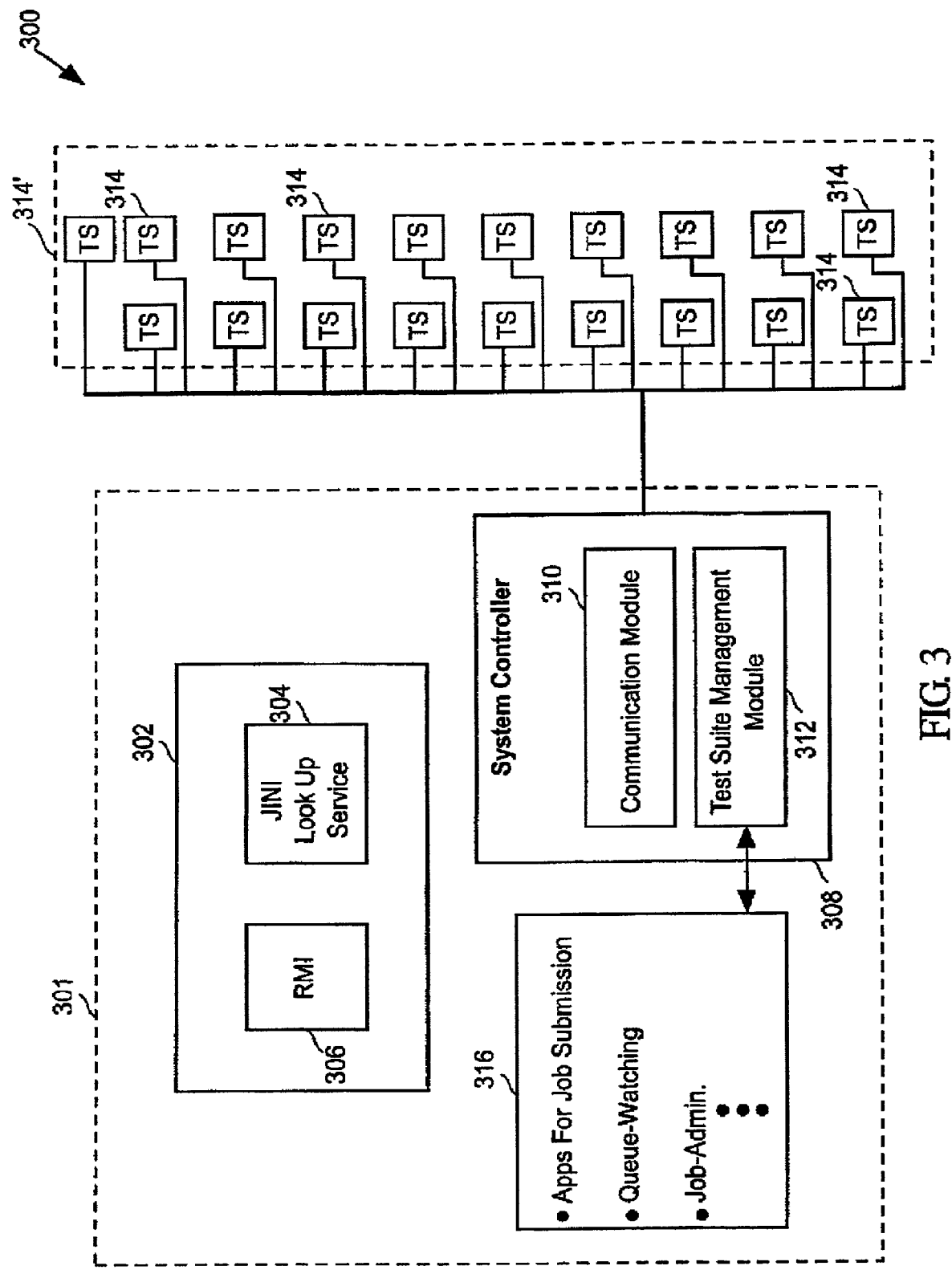
FIG. 3 is a block diagram of a distributed test framework (DTF) system, in accordance with one embodiment of the present invention.

Keeping these brief overviews of Jini and Java as they relate to the embodiments of the present invention in mind, reference is now made to FIG. 3 illustrating a block diagram of a distributed test framework (DTF) system 300, in accordance with one embodiment of the present invention. As shown, physically, the DTF system 300 includes two groups of computer systems: (1) a system server group 301, and (2) a test system group 314'. The system server group 301 includes a service component 302 and a system controller 308. The service component 302 is configured to contain a Jini look up service 304 and a Remote Method Invocation (RMI) 306. In one embodiment, the RMI is designed to handle various communication needs. Comparatively, the Jini look up service 304 is a dedicated process running on the master computer system, server, and is configured to function as a central registry. As used herein, the master computer system is defined as the computer system running the system controller 308. As designed, in one embodiment, the master computer is configured to include both the system controller 308 and the service component 302. However, in a different implementation, each of the system controller 308 and the service component 302 may be included and run by separate computer systems. As designed, the look up service 304 is configured to enable the system controller 308 to locate available computer systems of an ad-hoc network of computer systems to execute a given test execution request using the test system registerable attributes. For instance, the look up service 304 includes registerable attributes, which identify the test machine platform, operating system, and other software and hardware characteristics.

The illustrated system controller 308 includes a communication module 310 and a test suite management module 312. The communication module 310 manages the communication between the system controller 308 and the distributed test systems 314. For instance, the communication module 310 is responsible for locating available test systems 314, running test execution requests, and gathering information regarding the status of the test systems 314. In one example, the system controller 308 manages the communication with the distributed test systems 314 by implementing a plurality of threads. In this manner, the system controller 308 has the capability to communicate with a plurality of test systems 314 in parallel. However, it should be noted that in other embodiments, the system controller 308 can implement any suitable mechanism to manage the communication between the system controller 308 and the distributed test systems 314 (e.g., Jini, RMI, TCP/IP Sockets, etc.).

The test suite management module 312 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 312 maintains an inqueue directory designed to include almost all the submitted test execution requests. Once the system controller 308 is initiated, the system controller 308 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 312 is configured to manage the software applications and user interfaces implemented for job submission, queue watching, job administration, etc., as shown in 316.

The test system group 314' includes a plurality of test systems 314 having similar or diverse hardware and software configuration. Although shown as a group, the test systems 314 are not necessarily limited to testing. In fact, the test systems 314 can be computers or systems used by employees of a company for normal desktop work. So long as the test systems 314 are associated with the networked group, the processing power of these test systems 314 can be used. In one embodiment, the test systems 314 can be used during normal working hours when the test systems 314 are running, for example, business applications, or during off hours, thus tapping into potentially huge processing resources that would otherwise be left unused. It should therefore be appreciated that test systems 314 do not necessarily have to be solely dedicated to testing or processing for the system server group 301.

In one embodiment, the test systems 314 are configured to execute the test execution requests dispatched by the system controller 308. Each of the test systems 314 runs an agent process (not shown in this Figure) designed to register the respective test system 314 with the Jini look up service 304. In this manner, the agent process for each test system 314 advertises the availability of the associated test system 314. As will be discussed in further detail below, a machine service component of the agent is used to establish communication between the associated test system 314 and the system controller 308. Specifically, by implementing the Jini attributes, the machine service registers the test system 314 characteristics with the Jini look up service 304. The test system 314 attributes are subsequently used by the system controller 308 to locate a test system 314 suitable to execute a specific test execution request.

While the DTF system 300 of the present invention can physically be divided into two groups, logically, the DTF system 300 of the embodiments of present invention comprises three over all components: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Quit an appropriate shell script to destroy all the processes.

Submit jobs: Before the system controller 308 is launched, an Extensible Markup Language (XML) formatted test-execution-request file is created in the inqueue directory (e.g., that is preferably part of the test suite management module). In this manner, once the system Controller 308 is launched, the system controller 308 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 308 is configured to implement various input files.

The second logical component, the test scheduler and system controller, includes the system controller 308 configured to perform the function of managing the job queues and dispatching the test execution requests to test system 314 for processing. Thus, the system controller 308 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 308 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 314 having the required characteristics is available to execute the job.

Figure 4:
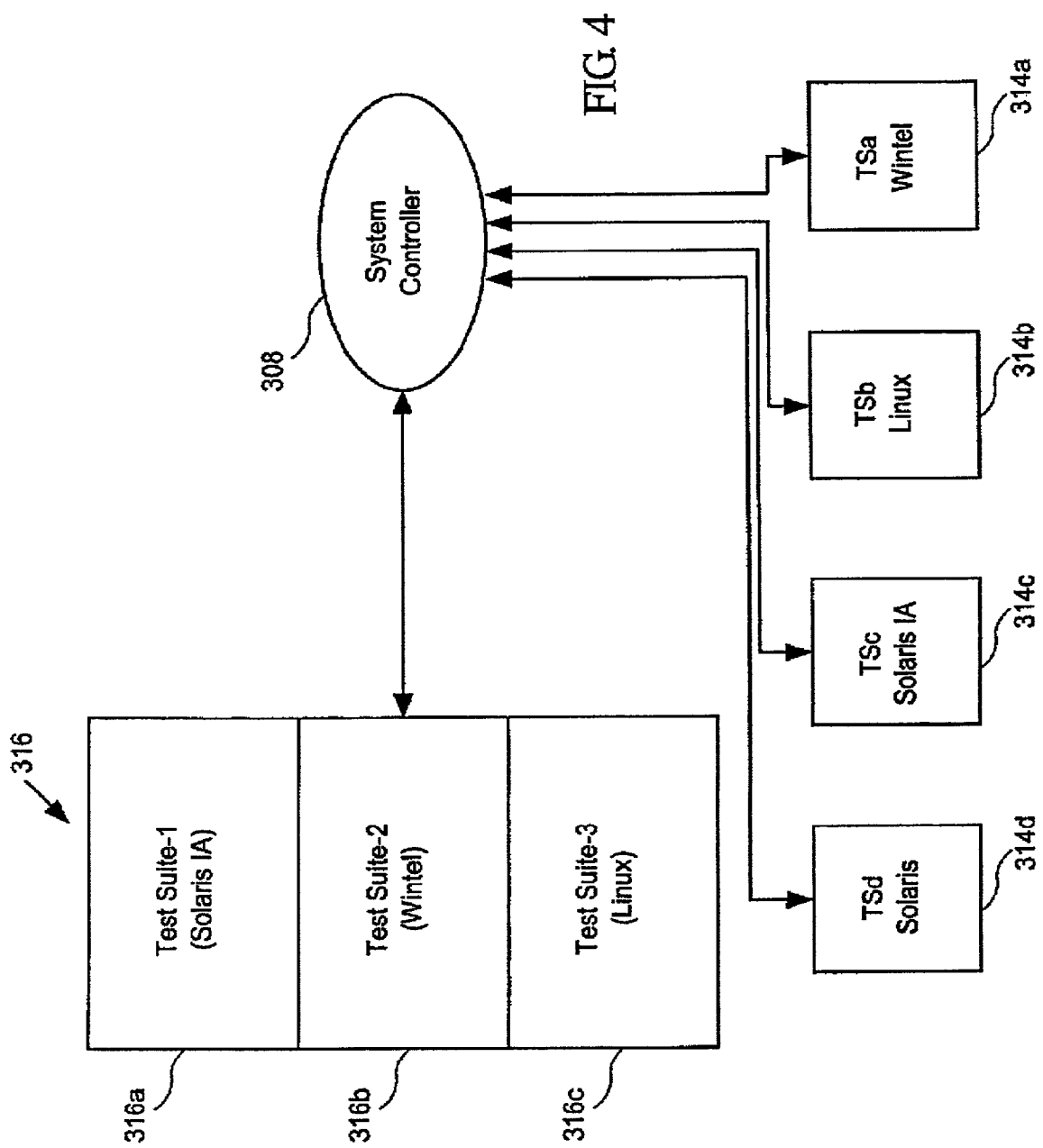
FIG. 4 is a block diagram illustrating the capability of the present invention to intelligently locate an available and suitable test system to execute a test suite, in accordance with another embodiment of the present invention.

Reference is made to a block diagram depicted in FIG. 4 wherein the capability of the present invention to intelligently locate a test system 314 available to execute a test suite is illustrated, in accordance with one embodiment of the present invention. As shown, an inqueue directory 316 contains a plurality of test execution requests 316a, 316b, and 316c. In accordance with one embodiment of the present invention, once the system controller 308 is initiated, the system controller 308 is designed to read each test execution request 316a–316c contained within the inqueue directory 316. As shown, each test suite request 316a–316c must be executed by a test system 314 capable of running the test execution request requirements. For instance, each of the test execution requests 316a, 316b, and 316c must be run on a Solaris IA™ test system, a Wintel™ test system, or a Linux™ test system, respectively. The DTF system 300 of the present invention has the capability to advantageously locate an available test system from a plurality of ad-hoc network of test systems 314a, 314b, 314c, and 314d to execute each of the test execution requests 316a–316c.

As shown in the embodiment depicted in FIG. 4, each of the test systems 314a–314d has a different software and hardware configuration. For instance, while the test system 314a is run on Wintel™ and the test system 314b is run on Linux™, the test systems 314c and 314d are programmed to run on Solaris IA™ and Solaris™, respectively. As will be discussed in more detail below, the machine service for each test system 314a–314c registers the respective test system 314a–314c with the Jini look up service using the Jini attributes. Particularly, the embodiments of the present invention are configured to register the hardware and software configuration for each test system 314a–314d with the Jini look up service 304. In this manner, the system controller 308 can search the Jini look up service 304 implementing the test execution request requirements as search criteria. Thus, as shown in the example of FIG. 4, the system controller 308 of the present invention selects the test systems 314c, 314a, and 314b to execute the test suite requests 316a–316c, respectively.

Figure 5:
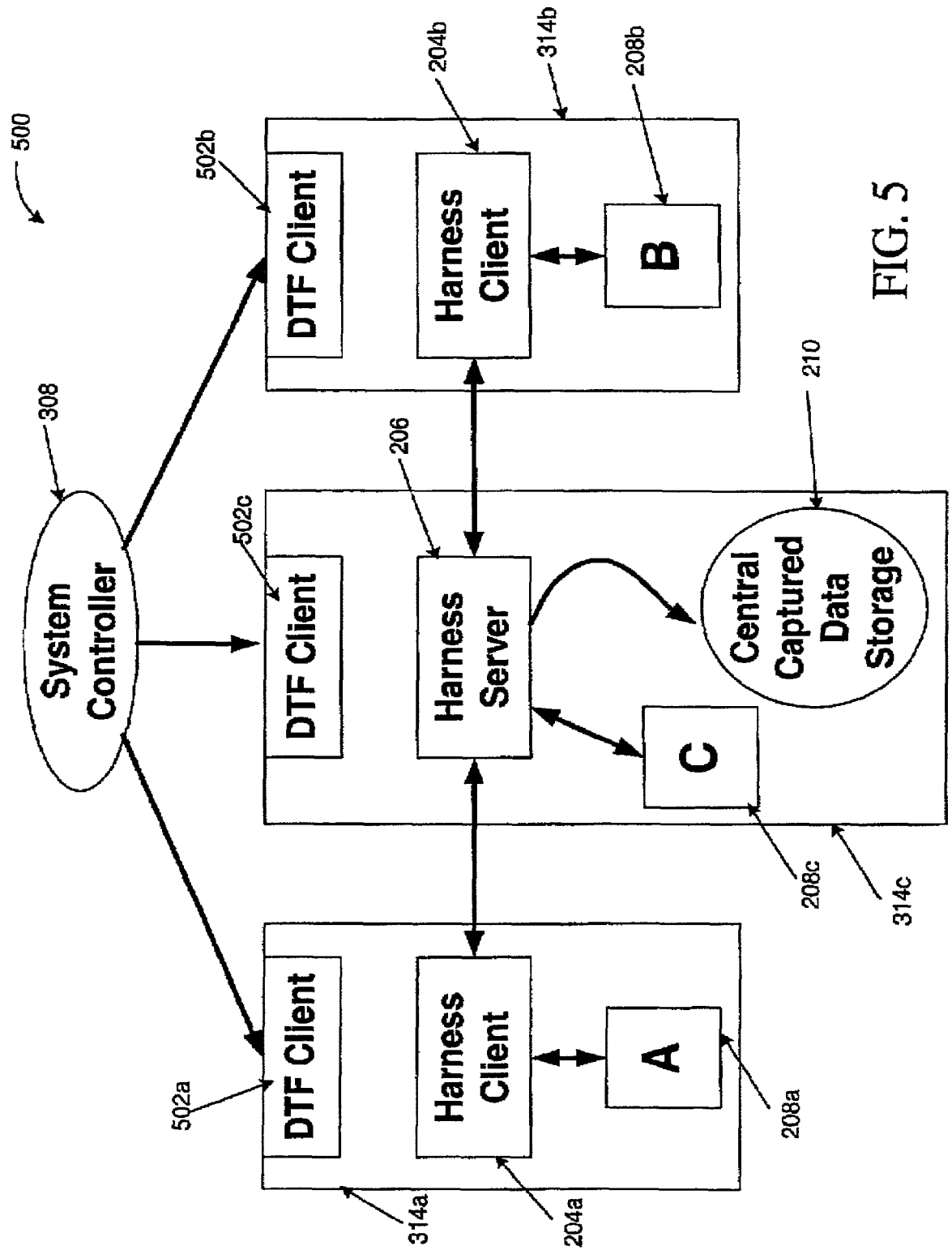
FIG. 5 is a block diagram showing a DTF launched distributed harness system for testing, in accordance with an embodiment of the present invention.

FIG. 5 is a block diagram showing a DTF launched distributed harness system 500, in accordance with an embodiment of the present invention. The DTF launched distributed harness system 500 includes a system controller 308 in communication with a plurality of DTF clients 502a–502c, each executing on computer test systems 314a–314c. The system controller 308 can be used to automate launch of the distributed harness system 500 in a manner similar to the automated launch of test applications described above.

Specifically, the system controller 308 determines which computer systems are available to launch the harness server 206 based on the requirements of a particular test. Once appropriate computer system is found, the system controller 308 transmits a command to the DTF client 502c to launch the harness server 206. In response, the DTF client 502c launches the harness server 206, which initializes itself using a configuration file that provides information about the distributed operating environment. The configuration file also includes information regarding which harness clients are to be used for the test. Based on the configuration file, the harness server 206 requests the system controller 308 to launch the appropriate harness clients.

For example, in FIG. 5, the harness server 206 requests the system controller 308 to launch the harness clients 204a–204b. In response, the system controller 308 transmits a command to the DTF clients 502a and 502b to launch the harness clients 204a and 204b. Upon receiving the launch command from the system controller 308, each DTF client 502a–502b launches the appropriate harness client 204a–204b.

The harness server 206 then listens for the harness clients 204a–204b that comprise the distributed harness system 500. Each harness client 204a–204b also initializes itself using a client configuration file. Each client configuration file includes information needed by the particular harness client for initialization, such as the location of the harness server 206 and specific configuration parameters needed for a particular test. The harness clients 204a–204b then register with the harness server 206.

Once the harness clients 204a–204b are initialized and registered with the harness server 206, the harness server 206 can begin to launch and monitor applications on the test computer systems 314a–314c. Specifically, the harness server 206 processes a script file that defines what operations the harness server 206 should perform, and any parameters for the operations. These operations can include launching applications on both the test computer systems 314a–314c, and control operations for launched applications.

In addition to launching applications in a controlled manner, embodiments of the present invention monitor the application execution and output to provide further execution control. In particular, each harness module monitors the execution and output of the applications that the harness module launches. For example, the harness client 204a monitors the execution and output of application A 208a, the harness client 204b monitors the execution and output of application B 208b, and the harness server 206 monitors the execution and output of application C 208c.

This information is transmitted to the harness server 206, which analyzes the monitored information. In this manner, the test harness can perform predefined operations based on the execution and output information from the various applications under its control. In addition to analyzing the monitored information, the harness server 206 stores the monitored information for each application in a central captured data storage 210. For each application 208a–208c, the central captured data storage 210 includes an application output file, an application error data file, and an application log file.

As mentioned previously, efficient execution of tasks on remote resources is accomplished in the embodiments of the present invention using virtual service modules. Broadly speaking, each virtual service module is in communication with a similar virtual service module on the remote resource via a communication channel, as described next with reference to FIG. 6.

Figure 6:
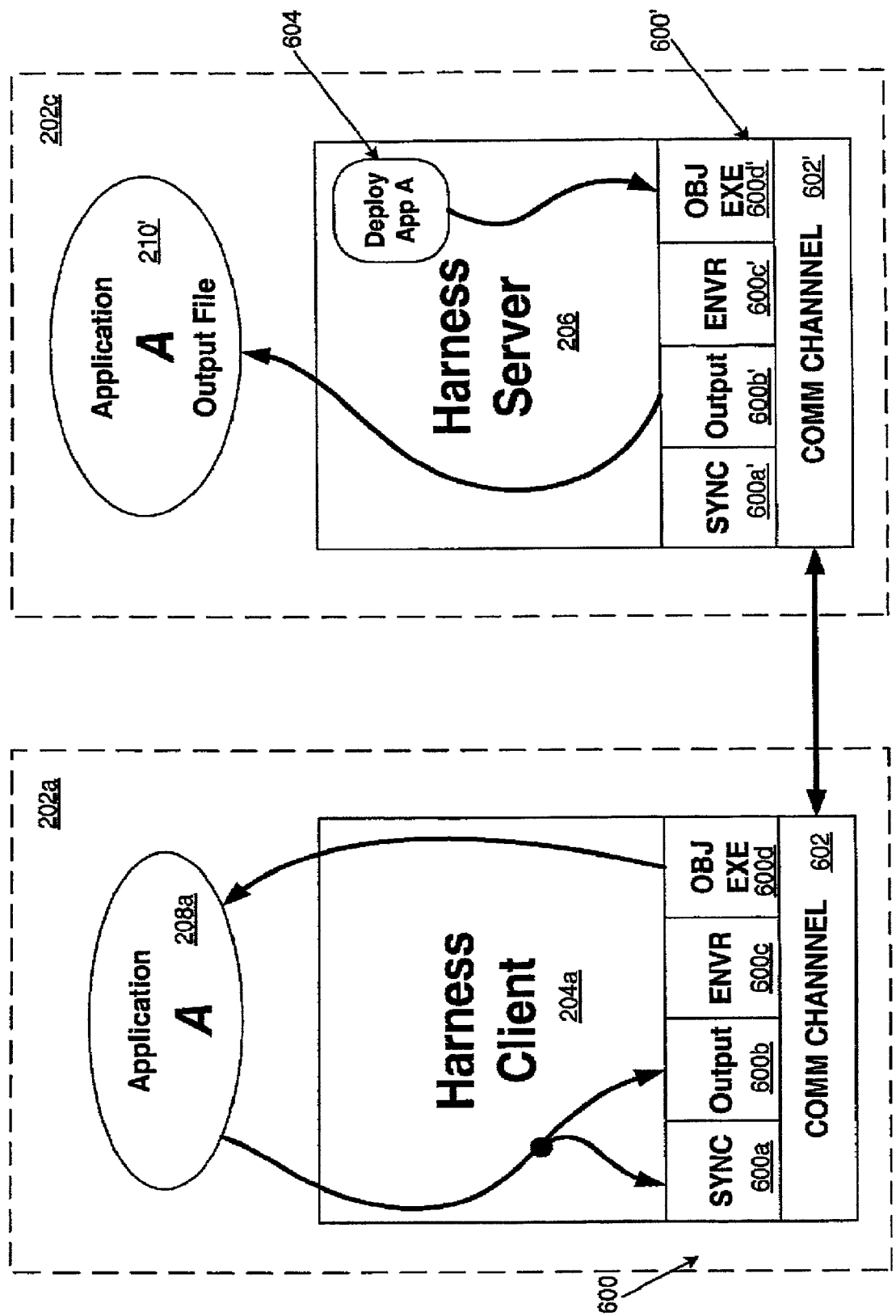
FIG. 6 is a block diagram showing an exemplary remote execution model using virtual service modules, in accordance with an embodiment of the present invention.

FIG. 6 is a block diagram showing an exemplary remote execution model using virtual service modules, in accordance with an embodiment of the present invention. The exemplary remote execution model includes a client computer system 202a executing a harness client 204a in communication with a harness server 206 executing on a server computer system 202c. Broadly speaking, communication between the harness client 204a and the harness server 206 remote resources is accomplished via a plurality of virtual service modules that are substantially duplicated on each remote resource.

In particular, the harness client 204a includes a plurality of service modules 600, each in communication with a communication channel 602. A communication channel 602' is also present on the harness server 206. The communication channel 602' on the harness server 206 provides a communication link for the virtual service modules 600' included in the harness server 206. Each virtual service module 600a–600d on the harness client 204a has a companion virtual service module 600a'–600d' on the harness server 602, which form a virtual service module set. For example, the output virtual service module 600b, on the harness client 204a, and the output virtual service module 600b', on the harness server 206, form an output virtual service module set. Communication between the service modules is provided using a communication channel 602. The communication channel 602 functions directly with the network hardware and provides a layer of abstraction for the virtual service modules. In this manner, each virtual service module can communicate with the communication channel 602 in a generic manner to reduce the need for specialized functions dependent on particular network hardware.

Each virtual service module 600–600' is also configured to communicate with the appropriate distributed harness component, harness client 204a or harness server 206, using functions appropriate for the particular operating environment in which the distributed harness component is operating. By having companion virtual service modules on each distributed harness component, embodiments of the present invention can query and receive data from the virtual service modules of remote resources as though the virtual service modules were a single local structure. That is, a distributed harness component, such as the harness client 204a, can requests a value from a virtual service module 600, and the value will be returned regardless of the actual physical location of the data.

For example, when the harness server 206 processes a deploy application A command 604 from the configuration file, the harness server 206 analyzes the command 604 to determine which distributed harness component should execute the command 604. In the example of FIG. 6, application A 208a is located on computer system 202a. Hence, the harness server 206 provides the deploy application A command 604 to the object execute module 600d' including the location of harness client 204a. The object execute object 600d' transmits the command 604 to the companion object execute object 600d executing on the harness client 204a using the communication channel 602.

Upon receiving the command 604 from the object execute module 600', the object execute module 600 executing on the harness client 204a can query the environment module 600c to obtain any environment variables that are needed, and the class path of application A 208a. In response, the environment module 600c queries the companion environment module 600c' on the harness server 206 to obtain the class path and any other environment variables. In this manner, the execution environment for application A 208a can be set using a configuration file located on the harness server computer system 202c. Upon receiving the response from the environment module 600c, the object execute module 600d launches the application A 208a using the obtained class path and environment variables.

As application A 208a executes, the harness client 204a monitors the generated output of application A 208a and transmits the output to the harness server 206 using the sync module 600a and output module 600b. Specifically, the harness client 204a filters the output of application A 208a for sync information, which is separated from other output and provided to the sync module 600a. The sync module 600a transmits the sync information to the companion sync module 600a' located on the harness server 206. The harness server 206 then monitors the sync information to provide enhanced control for application A 208a and other applications executing under the control of the distributed harness system.

The output module 600b transmits the output of application A 208a to the companion output module 600b' located on the harness server 206. The harness server 206 then stores the output of application A 208a in an application A output file 210'. In this manner, all application output is stored in a centralized location, which can be examined at a later time without requiring each remote system to be examined for application output.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A remote execution system, comprising:
    a first computing resource including:
        a harness server application having a first plurality of virtual service modules, each virtual service module of the first plurality of virtual service modules capable of providing a corresponding functionality;
        an execution instruction and execution data for a first application; and
        a first application output file;
    a second computing resource including:
        a first harness client application having a second plurality of virtual service modules substantially equivalent to the first plurality of virtual service modules, each virtual service module of the second plurality of virtual service modules being in communication with a substantially equivalent virtual service module of the first plurality of service modules to form a virtual service module set; and
        a first application; and
    a computer network including a communication channel, each virtual service module of the second plurality of virtual service modules being in communication with the substantially equivalent virtual service module of the first plurality of service modules through the communication channel on the computer network, the first computing resource being capable of executing the first application on the second computing resource through at least one of the virtual service module sets, wherein the first computing resource is capable of communicating the execution instruction and the execution data to the first application on the second computing resource, the first application is capable of producing an output in response to the execution instruction and the execution data, the output being communicated to the first application output file on the first computing resource through at least one of the virtual service module sets, wherein each virtual service module set is capable of interacting with the first application as a single software object that is local to the first application.

2. A remote execution system as recited in claim 1, further comprising a third computing resource including a second harness client application having a third plurality of virtual service modules substantially equivalent to the first plurality of virtual service modules, each virtual service module of the third plurality of virtual service modules being in communication with a substantially equivalent virtual service module of the first plurality of service modules to form a virtual service module set.

3. A remote execution system as recited in claim 2, wherein the harness server application transmits data to the first harness client application and the second harness client application using the first plurality of virtual service modules.

4. A remote execution system as recited in claim 3, wherein the first harness client application and the second harness client application receive the data using the second plurality of virtual service modules and the third plurality of service modules.

5. A method for remote execution control, comprising the operations of:
    providing a harness server application having a first plurality of virtual service modules, each virtual service module of the first plurality of virtual service modules capable of providing a corresponding functionality, the harness server application included in a first computing resource;
    deploying an execution command in the harness server application, the execution command being for a first application, deploying the execution command to the first application including deploying execution data to the first application;
    providing a first harness client application having a second plurality of virtual service modules substantially equivalent to the first plurality of virtual service modules, each virtual service module of the second plurality of virtual service modules being in communication with a substantially equivalent virtual service module of the first plurality of service modules to form a virtual service module set, the harness client application included in a second computing resource, wherein the second computing resource includes the first application;
    providing a computer network including a communication channel, each virtual service module of the second plurality of virtual service modules being in communication with the substantially equivalent virtual service module of the first plurality of service modules through the communication channel on the computer network;
    executing the first application on the second computing resource through at least one of the virtual service module sets;
    producing an output from the first application in response to the execution instruction and the execution data; and
    communicating the output to a first application output file on the first computing resource through at least one of the virtual service module sets;
    wherein the first application interacts with each virtual service module set as a single software object that is local to the first application.

6. A method as recited in claim 5, further comprising the operation of providing a second harness client application having a third plurality of virtual service modules substantially equivalent to the first plurality of virtual service modules, each virtual service module of the third plurality of virtual service modules being in communication with a substantially equivalent virtual service module of the first plurality of service modules to form a virtual service module set.

7. A method as recited in claim 6, further comprising the operation of transmitting data from the harness server application to the first harness client application and the second harness client application using the first plurality of virtual service modules.

8. A method as recited in claim 7, further comprising the operation of receiving data at the first harness client application using the second plurality of virtual service modules, and receiving data at the second harness client application using the third plurality of virtual service modules.

* * * * *